Dec. 23, 1924.

G. LAWSON

COTTON DRIER

Filed April 22, 1920     2 Sheets-Sheet 1

1,520,187

INVENTOR
Gordon Lawson
BY
Hardway & Cochran
ATTORNEYS

Dec. 23, 1924. 1,520,187

G. LAWSON

COTTON DRIER

Filed April 22, 1920 2 Sheets-Sheet 2

INVENTOR
Gordon Lawson
BY
Hardway Cathy
ATTORNEYS

Patented Dec. 23, 1924.

1,520,187

UNITED STATES PATENT OFFICE.

GORDON LAWSON, OF WHARTON, TEXAS, ASSIGNOR OF ONE-FOURTH TO VALENTINE LICHNOVSKY, OF WILSON COUNTY, TEXAS, THREE HUNDRED AND THIRTY-THREE FOUR-THOUSANDTHS TO THEO ROGGE, OF LAVACA COUNTY, TEXAS, ONE HUNDRED AND SIXTY-FIVE TWO-THOUSANDTHS TO J. T. STOCKTON AND FORTY-FIVE FOUR-THOUSANDTHS TO JULIUS DORENFIELD, JR., BOTH OF TRAVIS COUNTY, TEXAS, ONE HUNDRED AND NINETY-ONE ONE-THOUSANDTHS TO GROVER G. LAWSON, OF MATAGORDA COUNTY, TEXAS, AND ONE HUNDRED AND NINETY-ONE ONE-THOUSANDTHS TO ELMO E. LAWSON, OF SAN PATRICIO COUNTY, TEXAS.

COTTON DRIER.

Application filed April 22, 1920. Serial No. 375,838.

*To all whom it may concern:*

Be it known that GORDON LAWSON, a citizen of the United States, residing at Wharton, in the county of Wharton and State of Texas, has invented certain new and useful Improvements in a Cotton Drier of which the following is a specification.

This invention relates to new and useful improvements in a cotton drier.

One object of the invention is to provide an apparatus of the character described which is specially designed for the purpose of drying seed cotton before it is delivered to the gin; the apparatus however is adapted for the purpose of drying cotton fiber in any state, preparatory to the handling of the same, and will be used in the process of re-ginning and re-conditioning waste cotton. In the ginning or re-ginning of cotton, if the fiber is damp, the cotton will be injured and the grade thereof reduced and for the purpose of drying said cotton the apparatus herein described has been provided.

Another object of the invention is to provide a device of the character described which may also be used for drying other materials such as peanuts, beans and other similar vegetables.

A further feature of the invention resides in the provision of an apparatus of the character described which is so constructed that the cotton or other material passing therethrough may be subjected to heat sufficient to kill insects such as boll weevil, pink boll worm or other insects with which the material may be infested.

A still further feature of the invention resides in the provision of a device of the character described which is of simple construction and which consequently may be cheaply manufactured and easily kept in repair.

Figures 1, 2:
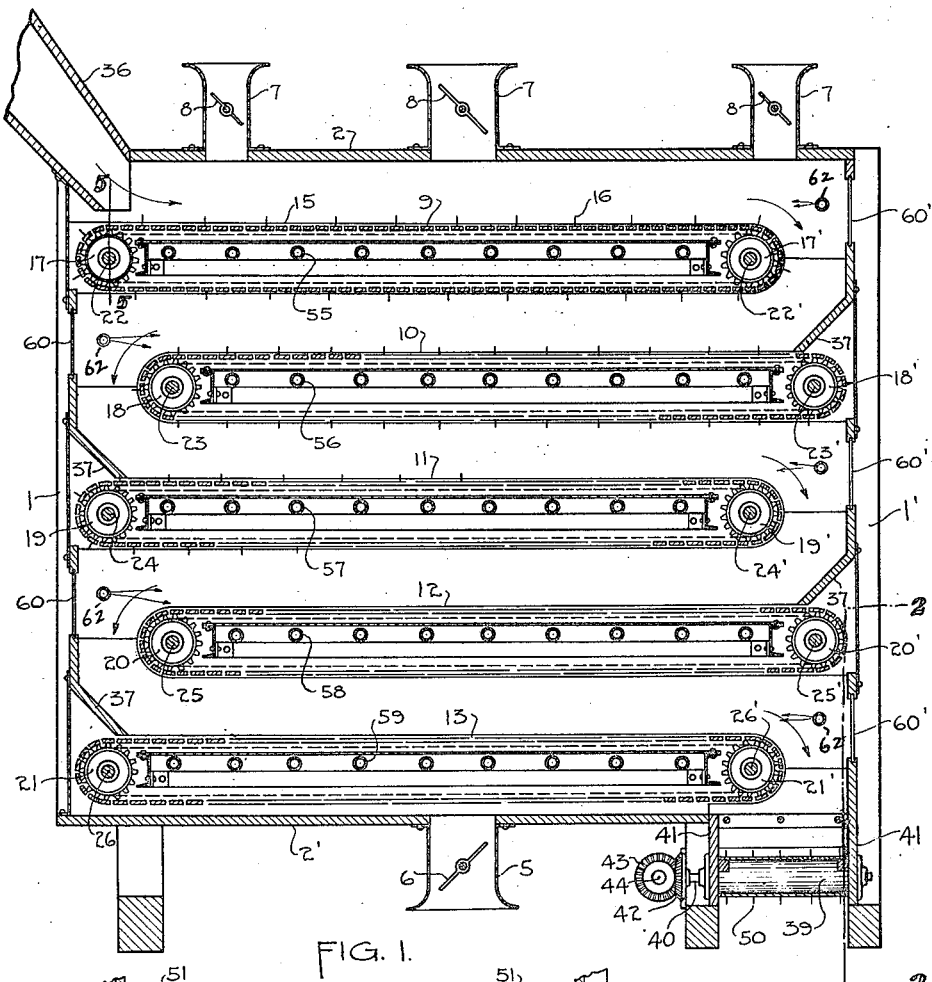

With the above and other objects in view the invention has particular relation to certain novel features of construction, operation and arrangement of parts, an example of which is given in this specification and illustrated in the accompanying drawings, wherein:

Figure 1 is a vertical, sectional view of the device.

Figure 3:
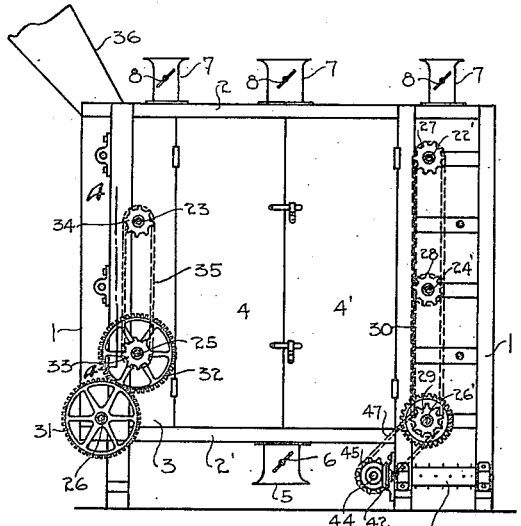
Figure 4:
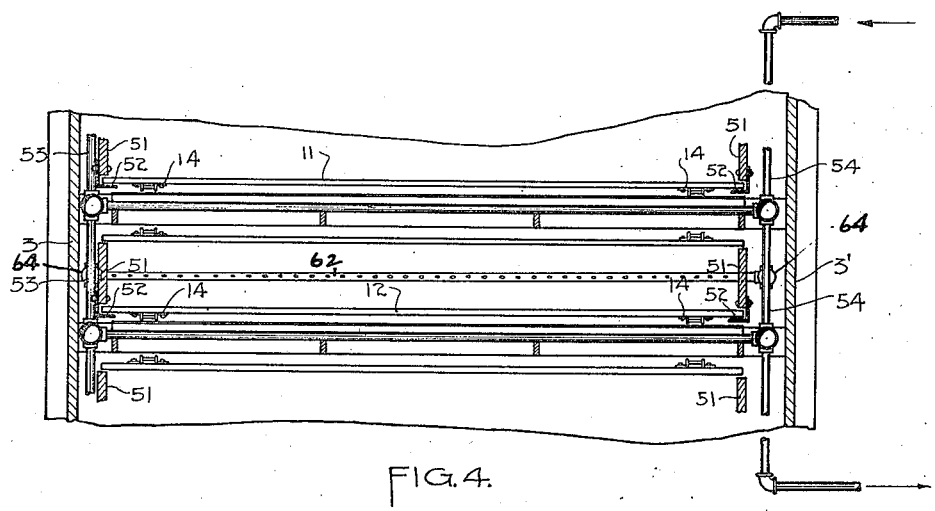
Figure 5:
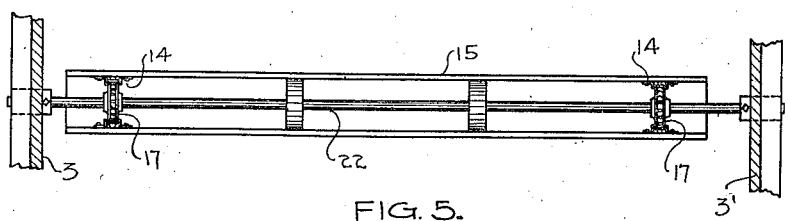

Figure 2 is a fragmentary, transverse sectional view taken on the line 2—2 of Figure 1, Figure 3 is a side elevation of the device, Figure 4 is a fragmentary, vertical, sectional view taken on the line 4—4 of Figure 3, and Figure 5 is a fragmentary, transverse, sectional view taken on the line 5—5 of Figure 1.

Referring now more particularly to the drawings, wherein like numerals of reference designate similar parts in each of the figures, the numerals 1, 1' refer to the ends of the enclosing casing, the numerals 2, 2' refer to the top and bottom respectively thereof and the numerals 3, 3' refer to the front and rear side walls thereof. The front wall 3 is formed with suitable doors or shutters, 4, 4', which are hinged thereto, so that they may be readily opened and closed to permit access to the interior of the casing. The bottom 2' of the casing has a suitable air inlet 5 which is controlled by the damper 6 and the top 2 has a plurality of air outlets 7, 7, 7 which are controlled by the outlet dampers 8, 8, 8. The air inlet 5 and the air outlets 7, controlled by said dampers, are provided for the purpose of controlling the temperature within said casing as hereinafter described.

A plurality of traveling aprons 9, 10, 11, 12 and 13 are provided which are spaced apart, one above the other and which are longitudinally movable. Each apron is formed of side sprocket chains 14, 14 to which transverse slats 15 are secured, said slats being spaced a suitable distance apart and the aprons carry suitable projecting spikes 16 provided to engage with and move the material along from one apron to the next succeeding one. The sprocket chains 14, 14 of the respective aprons operate over corresponding sprocket wheels, 17, 17';

18, 18′; 19, 19′; 20, 20′; 21, 21′; which are fixed upon corresponding shafts 22, 22′; 23, 23′; 24, 24′; 25, 25′; 26, 26′. These shafts are rotatably mounted in suitable bearings carried by the respective sides 3, 3′ of the casing and are so arranged that the discharged ends of the respective traveling aprons will be spaced a suitable distance from the corresponding end walls 1, 1′. The respective shafts 22′, 24′ and 26′ are extended beyond the casing on one side and have the respective sprocket wheels 27, 28, 29 fixed thereon over which the sprocket chain 30 operates. The shaft 26′ is driven by any suitable means which may be found practical and drives the sprocket chain 30, and, through it the aprons 9, 11, and 13 in the direction indicated by arrows in Figure 1. One end of the shaft 26 is extended beyond the casing and has the spur gear wheel 31 fixed thereon which is in mesh with the spur gear wheel 32 which is fixed upon the corresponding extended end of the shaft 25. This end of the shaft 25 also has a small sprocket wheel 33 fixed thereon which is in alignment with the corresponding sprocket wheel 34 fixed upon the extended end of the shaft 23 and a sprocket chain 35 operates over these sprocket wheels 33 and 34 and transmits rotation from the former to the latter and through this mechanism the aprons 10 and 12 are driven in the direction indicated by the arrows in Figure 1. The material to be dried is delivered into the casing at the top through the delivery chute 36 on to the adjacent end of the apron 15 and is carried along by it to the discharge end of said apron and falls on to the apron 10 underneath and is then in a similar manner delivered successively to the aprons 11, 12 and 13. Transverse deflector boards as 37 are provided underneath the discharge ends of the respective aprons and these deflect the bat, as discharged, from one apron, onto the succeeding apron underneath. It is to be observed that as the bat is delivered from one apron to the next succeeding one its position is reversed, that is, the bottom of the bat as it travels along one apron becomes the top of the bat while traveling along the next succeeding apron. The material is delivered from the apron onto a transverse conveyor 38. This conveyor is of the form of an endless belt which operates over the end supporting rollers 39, 39′. These rollers are mounted upon suitable shafts 40, 40′ which are rotatably mounted in the sides 41, 41 of a conveyor chute and one end of the shaft 30 is extended and has the pinion 42 fixed thereon which is in mesh with a corresponding pinion 43 which is fixed upon the adjacent end of the shaft 44. This shaft 44 also has a sprocket wheel 45 fixed thereon which is in alignment with a corresponding sprocket wheel 46 fixed upon the corresponding end of the shaft 26′ and the sprocket chain 47 operates over the sprocket wheels 45 and 46 and imparts rotation from the latter to the former, thus providing means for driving the endless conveyor 38. This conveyor delivers the material to the outlet chute 49 for further disposition. The conveyor 38 has suitable projecting spikes 50 which engage with the material and carry the same along said conveyor. Suitable lengthwise side boards 51, 51 are provided at the sides between the respective aprons, as shown in Figures 2 and 4. Secured to the lower edges of these side boards are inwardly projecting flanges 52. The ends of the slats of the respective aprons 9—13 travel upon the upper edges of the respective side boards 51 underneath and likewise the ends of the slats of said respective aprons travel along the respective flanges 52 of the side boards above. These side boards consequently form, with the aprons between which they are located, enclosed chutes or passageways for the cotton or other material being dried.

Means for heating the chamber has been provided. It is to be understood that any well known heating means may be employed, to wit; steam, hot water, hot air, electricity, or any other heating appliance. As a preferred form I have shown heater coils for steam or hot water, but do not wish to limit myself to the specific means shown. Pipes 53 and 54 are arranged within the casing at the respective sides thereof and these pipes are connected by means of circulating coils 55, 56, 57, 58 and 59 which extend transversely of the casing within the respective aprons 9—13. A heating fluid such as hot air, hot water or, hot steam is circulated through these pipes and coils and furnish sufficient heat by radiation for drying the material and the temperature may be raised within the casing to a degree sufficient to kill any insects infesting cotton or other material. The temperature may be readily controlled by means of the inlet damper 6 and the outlet dampers 8 as above described.

The ends 1, 1′ of the casing are provided with suitable transparent panes 60, 60′ through which the interior of the device may be inspected while in operation.

Provision has been made for introducing hot steam into the casing which is projected against the cotton as it travels along the apron. For this purpose I have provided transverse nozzle pipes 62 which are connected at their respective ends to the pipes 53 and 54. These nozzle pipes are perforated at one side so that the heated steam may be spread through the perforations in a sheet against the cotton as it travels along the respective aprons and this steam being hot it will destroy any insect or larva in the cotton. These nozzle pipes are controlled by suitable shut off valves.

What I claim is:

1. A device of the character described including an enclosed casing having an inlet and an outlet, endless aprons forming conveyors arranged in succession therein, said conveyors being arranged to receive material delivered through said inlet and conduct the same through the casing and discharge it through said outlet, side boards forming sides for the conveyors and supporting the edges of the aprons, and means for heating the casing.

2. A device for drying cotton, and the like, including an enclosed casing having an inlet and an outlet, conveyors having stationary side boards and arranged in succession in the casing, one above the other, the upper conveyor being arranged to receive the cotton from said inlet and the succeeding conveyors being arranged to successively receive the cotton and conduct the same back and forth through the casing to the outlet, said conveyors and side boards forming a continuous chute from the inlet to the outlet.

3. A device for drying cotton, and the like, including an enclosed casing having an inlet and an outlet, conveyors arranged in succession in the casing, one above the other, side boards forming tracks which support the edges of the respective conveyors, the upper conveyor being arranged to receive the cotton from said inlet, and the succeeding conveyors being arranged to successively receive the cotton and conduct the same back and forth through the casing to the outlet, said conveyors and side boards forming a continuous chute from the inlet to the outlet, and means for supplying heat within the casing.

4. A device of the character described including an enclosed casing having an inlet and outlet, conveyor means arranged therein, and forming a continuous sinuous enclosed chute and provided to receive material through said inlet and discharge the same through said outlet, and transverse perforated, nozzle pipes provided to project hot fluid against said material as it travels along said conveyor.

In testimony whereof I have signed my name to this specification in the presence of two subscribing witnesses.

GORDON LAWSON.

Witnesses:
W. A. CATHEY,
A. ALLEN.